US012600306B2

(12) United States Patent
Mallent Bertolin et al.

(10) Patent No.: US 12,600,306 B2
(45) Date of Patent: Apr. 14, 2026

(54) DOOR ASSEMBLY WITH ASSEMBLED SUPPORT PART AND UPPER PART

(71) Applicant: FAURECIA INTERIEUR INDUSTRIE, Nanterre (FR)

(72) Inventors: Vicente Mallent Bertolin, San Antonio de Benageber (ES); Pramod Mathew John, Bhosari Pune (IN)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 498 days.

(21) Appl. No.: 18/188,175

(22) Filed: Mar. 22, 2023

(65) Prior Publication Data

US 2023/0303012 A1 Sep. 28, 2023

(30) Foreign Application Priority Data

Mar. 22, 2022 (FR) ................................ FR 22 02495

(51) Int. Cl.
*B60R 13/02* (2006.01)

(52) U.S. Cl.
CPC ...... *B60R 13/0243* (2013.01); *B60R 13/0206* (2013.01)

(58) Field of Classification Search
None
See application file for complete search history.

(56) References Cited

U.S. PATENT DOCUMENTS

| | | | | |
|---|---|---|---|---|
| 2,160,636 A | * | 5/1939 | Ball | B60R 13/0206 52/511 |
| 2,454,066 A | * | 11/1948 | Johnson | B60R 13/0243 52/511 |
| 5,111,619 A | * | 5/1992 | Billin | B60R 13/0206 24/297 |
| 7,104,590 B2 | * | 9/2006 | Dooley | B60N 2/78 296/146.7 |
| 7,669,915 B2 | * | 3/2010 | Lipski | B60R 13/0243 296/146.7 |
| 8,615,962 B1 | * | 12/2013 | Perez | B60R 13/0206 52/716.5 |

(Continued)

FOREIGN PATENT DOCUMENTS

| | | | | |
|---|---|---|---|---|
| DE | 102013214074 A1 | 2/2014 | | |
| FR | 2955365 A1 | * 7/2011 | ............ | F16B 5/0607 |

(Continued)

OTHER PUBLICATIONS

French Search Report corresponding to application FR 2202495, dated Nov. 4, 2022, 2 pages.

*Primary Examiner* — Catherine A Kelly
(74) *Attorney, Agent, or Firm* — Reising Ethington P.C.

(57) ABSTRACT

A door assembly for a vehicle that includes a support part and a top part mounted on the support part. One of the support part and of the upper part has a welding hole, and the other has a welding boss inserted into the welding hole along a direction of welding. The support part has at least one snap-fit slot. The upper part has at least one clip inserted into the at least one snap-fit slot. The at least one snap-fit slot and the at least one clip are arranged so as to lock the upper part along a direction of immobilization perpendicular to the direction of welding and in position along the direction of welding.

10 Claims, 3 Drawing Sheets

(56)            References Cited

U.S. PATENT DOCUMENTS

| | | | |
|---|---|---|---|
| 8,889,246 B2 * | 11/2014 | Surdu | ................. B60R 13/0206 |
| | | | 296/146.7 |
| 10,118,651 B2 * | 11/2018 | Dureiko | ............. B60R 13/0206 |
| 10,293,762 B2 * | 5/2019 | Onuma | ................... B60R 21/04 |
| 10,464,457 B1 * | 11/2019 | Doan | ................. B60R 13/0243 |
| 10,486,619 B2 * | 11/2019 | Li | ...................... B60R 13/0243 |
| 10,967,808 B2 * | 4/2021 | Masuda | ............. B60R 13/0243 |
| 11,305,705 B2 * | 4/2022 | Barrow | ............. B60R 13/0243 |
| 2006/0261633 A1 * | 11/2006 | Winborn | ............. B60R 13/0892 |
| | | | 296/146.7 |
| 2009/0145041 A1 * | 6/2009 | Yamada | ............. B60R 13/0243 |
| | | | 49/501 |
| 2014/0346799 A1 | 11/2014 | Balla et al. | |
| 2016/0121810 A1 | 5/2016 | Stanczak et al. | |
| 2020/0079297 A1 * | 3/2020 | Dominguez Cuevas | .................... |
| | | | B60R 13/0243 |

FOREIGN PATENT DOCUMENTS

| | | | | |
|---|---|---|---|---|
| KR | 20090016806 A | * | 2/2009 | ......... B60R 13/0206 |
| WO | WO-2011095746 A2 | * | 8/2011 | ......... B60R 13/0206 |

* cited by examiner

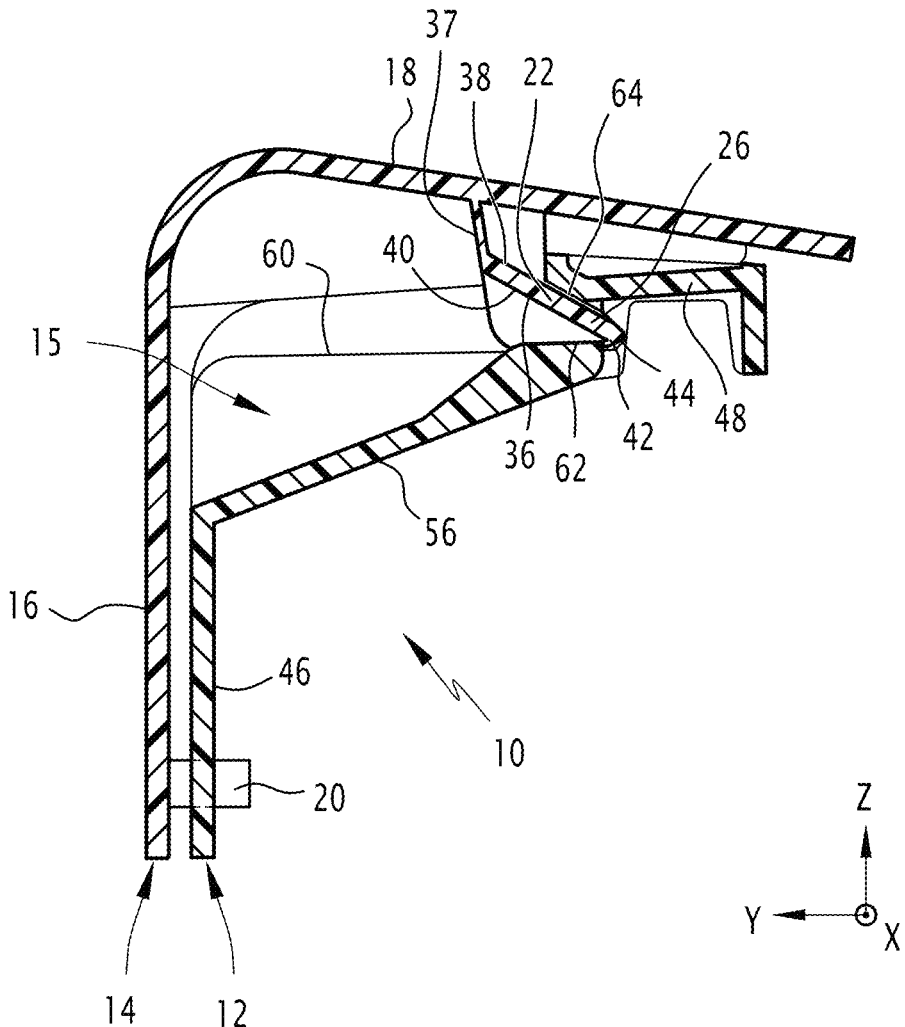
<u>FIG.3</u>

DOOR ASSEMBLY WITH ASSEMBLED SUPPORT PART AND UPPER PART

TECHNICAL FIELD

The present invention relates to a door assembly for vehicle, comprising a support part and an upper part mounted on the support part, a first one between the support part and the upper part comprising a welding hole, a second one between the support part and the upper part comprising a welding boss inserted into the welding hole along a direction of welding, the second one being distinct from the first one.

BACKGROUND

DE 10 2013 214 074 A1 describes an arrangement for assembling a door interior lining on an interior panel of a motor vehicle door. The door inner trim is clamped onto the door inner panel via at least one retaining clip located at a longitudinal fold of the door inner panel. The retaining clip is pushed by sliding onto the longitudinal fold.

The door inner lining has a continuation which fits in a fixed manner into an opening of the retaining clip.

However, the manner wherein the retaining clip is positioned with respect to the door interior trim is not specified.

SUMMARY

A goal of the present invention is thus to propose a vehicle door assembly which includes a support part and an upper part, wherein the positioning of the support part with respect to the upper part is improved.

To this end, the subject matter of the invention relates to a door assembly of the aforementioned type, wherein the support part comprises at least one snap-fit slot and the upper part comprises at least one clip inserted into the snap-fit slot or into a respective snap-fit slot of the at least one snap-fit slot, the or each snap-fit slot comprising at least one support surface extending along the direction of welding, the or each clip comprising at least one hook portion in contact with the at least one support surface of the snap-fit slot or the respective snap-fit slot in order to lock the upper part in one direction along a direction of immobilization, the locking direction being perpendicular to the direction of welding, wherein the or each snap-fit slot further comprises an opposite surface and a clip portion, the clip portion defining a snap-fit surface, the clip portion being elastically deformable so that the snap-fit surface is suitable for moving with respect to the support surface, the or each clip comprising a snap-fit portion snap-fitted between the snap-fit surface and the opposite surface of the snap-fit slot or of the respective snap-fit slot so as to lock the upper part in position along the direction of welding.

The cooperation of the snap-fit slot and of the clip, in particular the hook part and the support surface, can be used for immobilizing the upper part along a direction perpendicular to the direction of welding.

According to advantageous, yet optional, aspects of the invention, such a door assembly can comprise one or a plurality of the following features, taken individually or according to any technically permissible combination:

- the opposite surface extends opposite the support surface, the hook portion being held between the support surface and the opposite surface, with the hook portion in contact with the support surface and the opposite surface of the snap-fit slot or of the respective snap-fit slot, so as to lock the upper part in position along the direction of immobilization;
- the snap-fit surface is adjacent to the support surface along a direction perpendicular to the direction of immobilization and to the direction of welding;
- the or each snap-fit slot comprises two support surfaces, the snap-fit surface being arranged between the two support surfaces along the direction perpendicular to the direction of immobilization and to the direction of welding;
- the welding boss is welded to the welding hole;
- the or each snap-fit slot comprises edges suitable for holding the clip inside the snap-fit slot or the respective snap-fit slot along a direction perpendicular to the direction of immobilization and to the direction of welding;
- the upper part comprises a vertical portion and a horizontal portion, the welding boss or the welding hole being arranged on the vertical portion of the upper part, the or each clip being connected to the horizontal portion of the upper part;
- the support part comprises a vertical portion and a horizontal portion, the welding hole or the welding boss being arranged on the vertical portion of the support part, the support surface and, where appropriate, the snap-fit surface, being connected to the vertical portion of the support part;
- the support part comprises the welding hole, the upper part including the welding boss; and/or
- the opposite surface is arranged or connected to the horizontal portion of the support part.

BRIEF DESCRIPTION OF THE DRAWINGS

The invention and other advantages thereof will appear more clearly in the light of the following description of embodiments of the invention according to the concept of the invention, given only as an example and made with reference to the enclosed drawings, wherein:

FIG. 3 is a cross-section along the plane II of the door assembly shown in FIG. 1.

DETAILED DESCRIPTION

Figure 1:
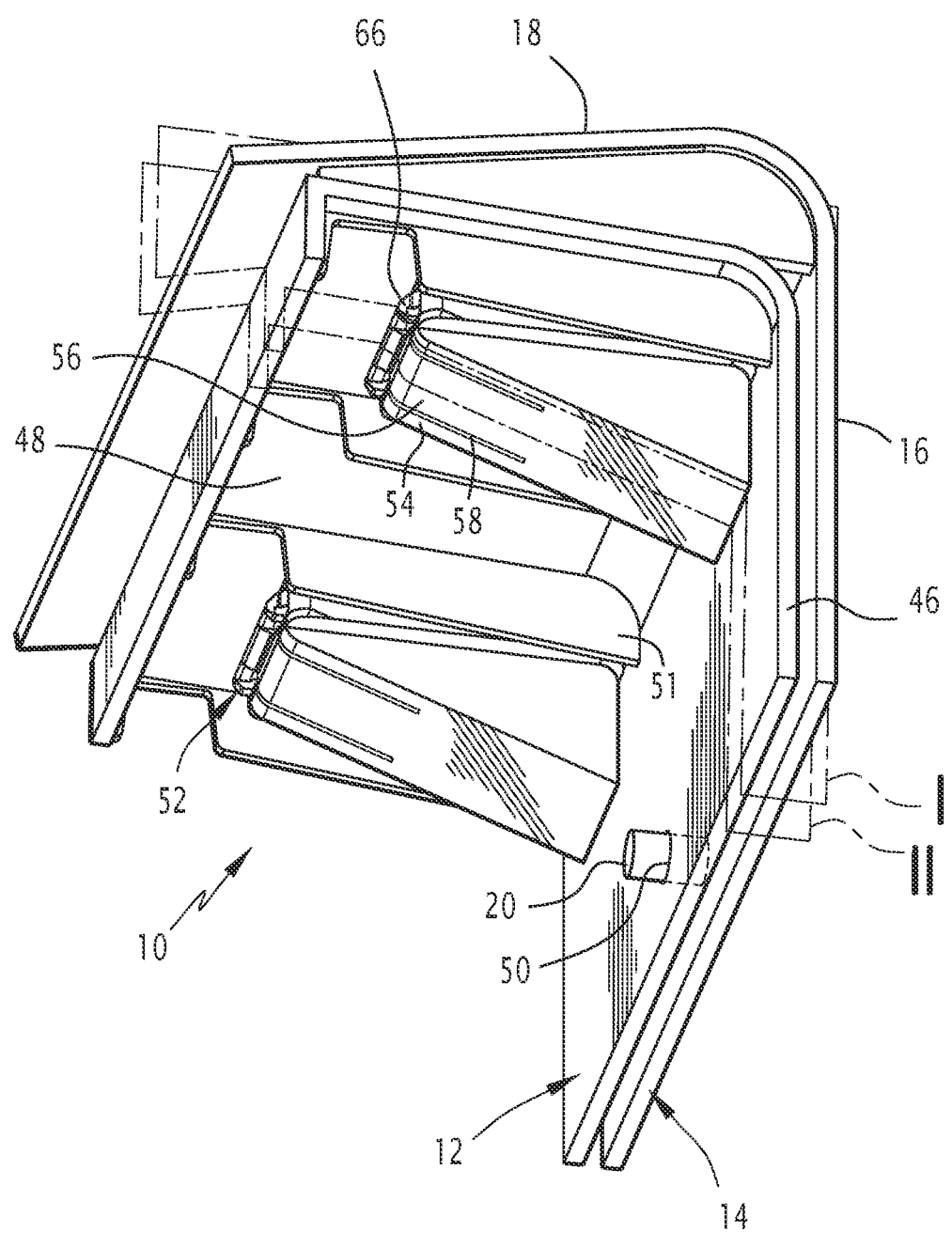
FIG. 1 is a schematic perspective view of a door assembly according to an embodiment of the invention.
Figure 2:
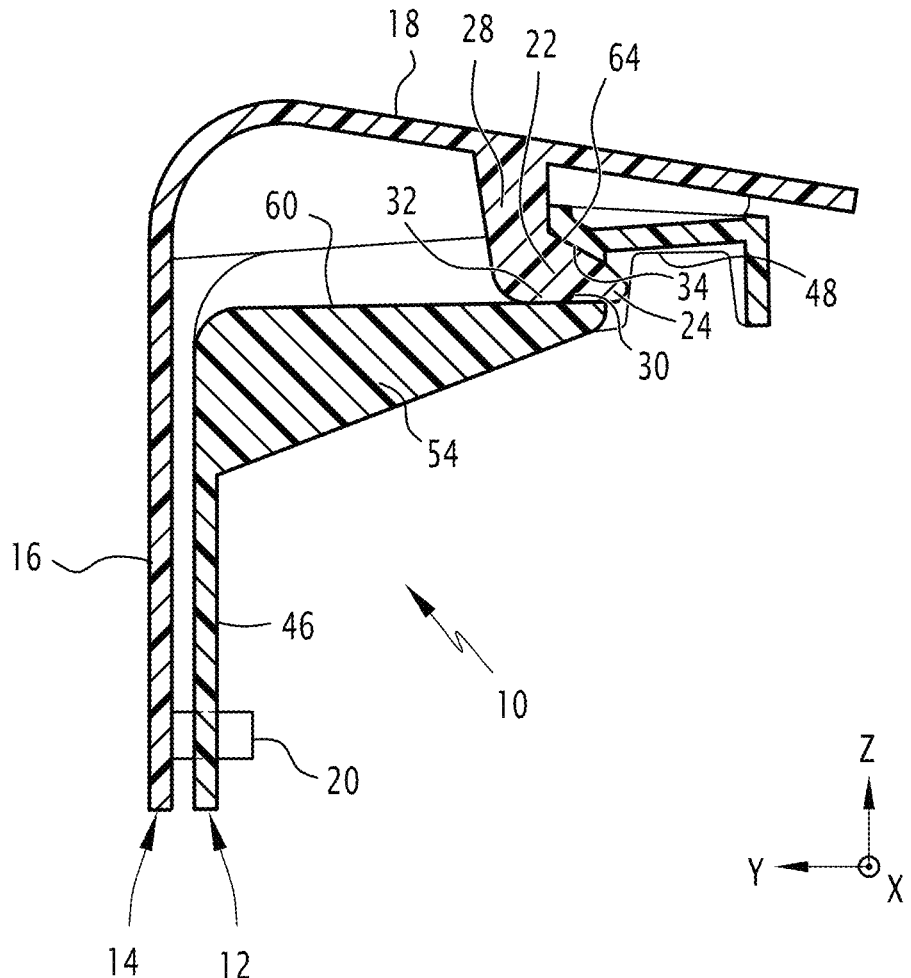
FIG. 2 is a cross-section view along the plane I of the door assembly shown in FIG. 1.

A vehicle door assembly 10 according to an embodiment of the invention is shown in FIGS. 1 and 3.

The door assembly 10 comprises a support part 12 and an upper part 14 assembled on the support part 12.

The upper part 14 has a concave shape, said concave shape defining a hollow housing 15.

The support part 12 extends e.g. into the hollow housing 15, so that the upper part 14 partially covers the support part 12.

The upper part 14 comprises a vertical portion 16 and a horizontal portion 18.

The vertical portion 16 extends herein substantially along a main plane. The principal plane extends along a first direction Z, herein called vertical direction, and a transverse direction X. The transverse direction X is perpendicular to the vertical direction Z.

A horizontal direction Y is defined as a direction perpendicular to each of the vertical direction Z and of the transverse direction X.

The vertical portion 16 herein comprises a wall extending along said main plane.

The vertical portion 18 herein extends substantially along another main plane extending along the transverse direction X and an auxiliary direction perpendicular to the transverse direction X.

The auxiliary direction forms an angle of less than 30°, preferentially 20°, with the horizontal direction Y.

The vertical portion 16 and the horizontal portion 18 together form an angle comprised between 60° and 120°, preferentially between 70° and 90°.

The upper part 14 comprises a welding boss 20.

The welding boss 20 is arranged on the vertical portion 16.

The welding boss 20 protrudes from the vertical portion 16, more precisely from the wall of the vertical portion, along a direction of assembly.

The direction of assembly is herein the horizontal direction Y.

The welding boss 20 protrudes from the vertical portion into the hollow housing 15.

The welding boss protrudes from the vertical portion 16 on the same side on which the horizontal portion extends.

The welding boss 20 has an invariant shape along the direction of assembly, herein the horizontal direction Y. More precisely, the welding boss 20 has herein the shape of a cylinder with the cylindrical axis along said direction.

The upper part 14 further comprises at least one clip 22, preferentially at least two clips, herein two clips 22.

Where appropriate, the clips 22 are aligned along transverse direction X.

The or each clip 22 extends into the recessed housing.

The or each clip 22 is not deformable during normal use of the assembly.

The or each clip 22 is connected to the horizontal portion 18 of the upper part 14.

More precisely, the or each clip 22 protrudes from the horizontal portion 18, more precisely from a wall of the horizontal portion extending along the main plane of the horizontal portion 18.

If necessary, the clips 22 are arranged on the same side of said wall.

The or each clip 22 protrudes from the horizontal part 18 into the hollow housing.

The or each clip 22 comprises at least one hook portion 24, herein two hook portions.

The or each clip 22 further comprises a snap-fit portion 26, herein arranged in-between and adjacent to the two hook portions 24 of said clip 22, more precisely along the transverse direction X.

Herein, the or each clip 22 consists of the two hook portions 24 and of the snap-fit portion 26.

The or each hook portion 24 comprises a base 28 and a head 30.

The base 28 protrudes from the horizontal portion 18 along the vertical direction by less than 10°, preferentially by less than 5°.

The head 30 protrudes from the base 28 along the direction of assembly Y, more precisely along a direction opposite the vertical part 16.

The head 30 defines a shoulder.

The cross-section of the head 30 perpendicular to the transverse direction X has an overall triangular shape.

The head 30 has a distal surface 32 on the opposite side of the head 30 with respect to the base 28.

The distal surface 32 herein extends substantially along a main plane extending, within plus or minus 5°, along the direction of assembly and along the transverse direction X.

Furthermore, the head 30 has a shoulder surface 34 connecting the distal surface 32 and the base 28.

The shoulder surface 34 extends obliquely between the base 28 and the distal surface 32.

The shoulder surface 34 herein extends essentially along a main plane extending in the transverse direction X and in a shoulder direction perpendicular to the transverse direction X.

The shoulder direction forms an angle comprised between 30° and 60° with the direction of assembly Y.

The shoulder surface 34 extends opposite the horizontal portion 18.

The snap-fit portion 26 comprises a snap-fit tab 36.

The snap-fit portion 26 further comprises a base 37 connecting the snap-fit tab 36 to the horizontal portion 18.

The snap-fit tab 36 is inclined in a similar way to the shoulder surface 34.

The snap-fit tab 36 is arranged at an angle similar to the angle of the shoulder surface 34.

The snap-fit tab 36 has an inner surface 38 facing the horizontal part 18 and an outer surface 40 oriented opposite the horizontal part 18.

The inner surface 38 is e.g. parallel to the shoulder surface 34.

The inner surface 38 herein extends substantially along a main plane identical to the plane of the shoulder surface 34.

The snap-fit tab 36 has a protuberance 42 at to the distal end 44 thereof.

The protuberance 42 extends from the snap-fit tab away from the horizontal portion.

The protuberance 42 forms a shoulder along the direction of assembly Y.

The shoulder is herein oriented towards the vertical portion 16.

The shoulder herein forms a stop along the direction of assembly Y along the direction going from the vertical portion 16 to the hollow housing.

The support part 12 is arranged in the hollow housing of the upper part 14.

The support part 12 has an overall shape similar to the upper part 14, so as to be arranged in the vicinity of the upper part 14.

The support part 12 comprises a vertical portion 46 and a horizontal portion 48.

The vertical portion 46 is parallel to the vertical portion 16 of the upper part 14.

The horizontal portion 48 herein extends substantially along a main plane extending along the transverse direction X and the direction of assembly Y.

The vertical portion 46 comprises a vertical wall extending along the main plane of the vertical portion 46 of the support part 12.

The support part 12, more precisely the vertical portion 46, comprises at least one welding hole 50, more precisely a through hole, preferentially crossing through the wall of the vertical portion 46 along the direction of assembly Y.

The welding hole 50 herein has the shape of a cylinder, matching the welding boss 20.

The support part 12 and the upper part 14 are arranged so that the welding boss 20 is inserted into the welding hole 50 along a direction of welding.

The welding boss 20 herein protrudes from the vertical portion 16 of the upper part 14 along the direction of welding.

Herein, the direction of welding is the horizontal direction Y.

The welding boss 20 is welded to the welding hole 50.

The horizontal portion 48 comprises a wall extending along the main plane of the horizontal portion 48.

The support part 12, more precisely the horizontal portion 48, comprises reinforcing ribs 51. The reinforcing ribs 51 are e.g. arranged on the wall of the horizontal portion 48 perpendicular to said wall of the horizontal portion 48. The reinforcing ribs 51 herein extend along the direction of welding.

The support part 12 further comprises at least one snap-fit slot 52, preferentially a plurality of snap-fit slots, herein two snap-fit slots.

The number of snap-fit slots 52 is identical to the number of clips 22.

The snap-fit slot(s) 52 are arranged so as to cooperate with the clip(s) 22, each slot cooperating with a respective clip.

The snap-fit slots 52 are aligned along the transverse direction X.

The or each snap-fit slot 52 is arranged on a side of the support part 12 opposite the upper part 14.

The or each snap-fit slot 52 is defined by at least one first part connected to the vertical portion 46 and at least one second part connected to the horizontal portion 48.

The first part protrudes from the vertical portion 46 of the support part 12 along a direction opposite the upper part 14.

The snap-fit slot 52, herein the first part, comprises at least one support portion 54, herein two support portions 54, and further herein, a clip portion 56.

The clip portion 56 is adjacent to the or each support portion 54 along the transverse direction X.

The clip portion 56 is herein arranged between the two support portions 54, more precisely along the transverse direction X.

The first part has a slot 58 between the clip portion 56 and each support portion 54. More precisely, each slot 58 extends between the clip portion 56 and the respective support portion 54, perpendicularly to the transverse direction X.

Each slot 58 extends from a distal end of the first portion to the vertical portion 46 over at least 25% of the continuation of the first portion along the direction of the slot.

The or each support portion 54 defines a support surface 60 extending along the direction of welding Y, more precisely along a main plane extending along the direction of welding Y and the transverse direction X.

The support surface 60 faces the horizontal part of the upper part 14.

The clip portion 56 defines a snap-fit surface 62.

The snap-fit surface 62 corresponds to an edge of the clip portion 56 along the direction of welding Y.

The clip portion 56 is elastically deformable with respect to the support surface 60, so that the snap-fit surface 62 is suitable for moving with respect to the support surface 60.

The at least one support surface 60 and the snap-fit surface 62 together define a first side of the corresponding snap-fit slot 52.

The snap-fit slot 52, more precisely the second part, comprises an opposite surface 64 extending facing the support surface 60, and herein the snap-fit surface 62.

The opposite surface 64 extends facing the support surface 60, preferentially along a direction perpendicular to the direction of welding Y and to the transverse direction X. Said direction corresponds herein to the vertical direction Z.

The opposite surface 64 is arranged or connected to the horizontal portion 48. Herein, the opposite surface 64 is arranged directly on the wall of the horizontal portion 48.

The opposite surface 64 has a shape and an arrangement matching the shape and the arrangement of the hook portion, more precisely the shoulder of the hook portion 24 formed by the shoulder surface 34.

The opposite surface 64 extends along a main plane extending along the transverse direction X and along the shoulder direction.

The opposite surface 64 is inclined with respect to the horizontal portion 48, more precisely the wall of the horizontal portion.

The opposite surface 64 has an extension along the transverse direction X equal to the extension of the support portion or portions 54 and, where appropriate, of the clip portion 56.

The opposite surface 64 defines a second side of the corresponding snap-fit slot 52.

In the embodiment shown, the snap-fit slot 52 further comprises edges 66, herein forming the edges of the snap-fit slot 52 along the transverse direction X.

Each edge 66 connects the opposite surface 64 to the or a corresponding support portion 54.

The or each clip 22 is inserted into the or a corresponding snap-fit slot 52.

The hook portion 24 is in contact with the support surface 60 of the corresponding snap-fit slot 52. In particular, the support surface 60 forms a stop for the hook portion.

The support surface 60 blocks the upper part 14 in a direction along a direction of immobilization, said direction of immobilization being perpendicular to the direction of welding Y.

More precisely, herein, the hook portion 24 is held between the support surface 60 and the opposite surface 64.

The hook portion 24 is in contact with each of the support surface 60 and the opposite surface 64, thereby being held in position.

The clip 22 is held in-between the support surface 60 and the opposite surface 64 along the direction of immobilization.

Thereby, the upper part 14 is locked in position with respect to the support part 12, along the direction of immobilization Z, in both directions of said direction of immobilization Z.

Furthermore, in the embodiment shown, the snap-fit portion 26 is clipped between the snap-fit surface 62 and the opposite surface 64 so as to lock the upper part 14 in position with respect to the support part 12 along the direction of welding Y.

In particular, the protuberance 42 is in contact with the clip portion 56 along the direction of welding Y, more precisely with the distal end of the clip portion 56.

Furthermore, the inner surface 38 of the snap-fit tab 36 is in contact with the opposite surface 64.

Thereby, the clip 22 is held in-between the opposite surface 64 and the clip portion 56, so as to be stationary along the direction of welding Y.

Furthermore, the edges 66 are suitable for holding the clip 22 inside the snap-fit slot 52 along the direction perpendicular to the direction of immobilization and to the direction of welding, herein the transverse direction X.

The or each clip 22 is thereby held in position in the or a corresponding snap-fit slot 52.

In this way, it is possible to hold the upper part 14 with respect to the support part 12.

The support part 12 provides reinforcement for the upper part 14.

A method of assembly an example of a door assembly according to an embodiment of the invention will now be described.

An upper part 14 and a support part 12 are provided as described hereinabove.

The welding boss 20 is inserted into the welding hole 50 along the direction of welding Y.

By such movement, the or each clip 22 is inserted into the corresponding snap-fit slot or slots 52.

In particular, herein, the hook portion 26 is inserted in-between the support surface 60 and the opposite surface 64.

The clip portion 56 deforms so as to let through the snap-fit tab 36. The distal end 44 of the snap-fit tab 36 clips onto the clip portion 56 when in position, so that the snap-fit tab 36 is held in-between the opposing surface 64 and clip portion.

Thereby, the deformation of the clip portion 56, so as to displace the snap-fit surface 62 with respect to the bearing surface 60, makes it easier to assemble the assembly.

The welding boss 20 is then welded onto the welding hole 50.

The upper part 14 and the support part 12 are thus fastened to each other.

The assembly of the upper part and the support part is thus simple and secure.

Assembly is done by inserting the welding boss into the welding hole and welding said elements together.

The clip(s) hold the upper part on the support part in position by means of the cooperation with the snap-fit slot(s), in particular along the direction of immobilization.

In another embodiment, not shown, the support part has the welding boss and the upper part defines the welding hole. In particular, said embodiment differs only by said difference.

The welding boss extends from the support part, more precisely from the vertical portion of the support part, along the direction of welding. The welding boss protrudes from the support part toward the upper part along the direction of welding.

The welding hole is delimited by the upper part, in particular on the vertical portion 16. The welding hole is a through hole along the direction of welding. The welding hole is arranged on the upper part so that the welding boss is inserted into the welding hole along the direction of welding when the upper part is assembled on the support part.

Such variant of embodiment can be further used for an easy assembly, along with a better positioning of the support part with respect to the upper part, and good holding in place.

The invention claimed is:

1. A door assembly for a vehicle, comprising a support part and an upper part mounted on the support part, a first one of the support part and the upper part comprising a welding hole, a second one of the support part and the upper part comprising a welding boss inserted into the welding hole along a direction of welding, the second one being distinct from the first one, wherein the support part comprises at least one snap-fit slot and the upper part comprises at least one clip inserted into the at least one snap-fit slot, the at least one snap-fit slot comprising at least one supporting surface extending in the direction of welding, the at least one clip comprising at least one hook portion in contact with the at least one support surface of the at least one snap-fit slot so as to lock the upper part in one direction along a direction of immobilization, said direction of immobilization being perpendicular to the direction of welding, wherein the at least one snap-fit slot further comprises an opposite surface and a clip portion, the clip portion defining a snap-fit surface, the clip portion being elastically deformable so that the snap-fit surface is suitable for moving with respect to the support surface, the at least one or each-clip comprising a snap-fit portion snap-fitted in-between the snap-fit surface and the opposite surface of the at least one snap-fit slot, so as to lock the upper part in position along the direction of welding.

2. The door assembly according to claim 1, wherein the opposite surface extends facing the support surface, the hook portion being held in-between the support surface and the opposite surface, the hook portion being in contact with the support surface and the opposite surface of the at least one snap-fit slot, so as to lock the upper part in position along the direction of immobilization.

3. The door assembly according to claim 1, wherein the snap-fit surface is adjacent to the support surface along a direction perpendicular to the direction of immobilization and to the direction of welding.

4. The door assembly according to claim 3, wherein the at least one snap-fit slot comprises two support surfaces, the snap-fit surface being arranged in-between the two support surfaces along the direction perpendicular to the direction of immobilization and to the direction of welding.

5. The door assembly according to claim 1, wherein the welding boss is welded onto the welding hole.

6. The door assembly according to claim 1, wherein the at least one snap-fit slot comprises edges suitable for holding the at least one clip inside the at least one snap-fit slot along a direction perpendicular to the direction of immobilization and to the direction of welding.

7. The door assembly according to claim 1, wherein the upper part comprises a vertical portion and a horizontal portion, the welding boss or the welding hole being arranged on the vertical portion of the upper part, the at least one clip being connected to the horizontal portion of the upper part.

8. The door assembly according to claim 1, wherein the support part comprises a vertical portion and a horizontal portion, the welding hole or the welding boss being arranged on the vertical portion of the support part, the support surface and, where appropriate, the snap-fit surface, being connected to the vertical portion of the support part.

9. The door assembly according to claim 1, wherein the support part comprises the welding hole, the upper part comprising the welding boss.

10. The door assembly according to claim 8, wherein the opposite surface is arranged or connected to the horizontal portion of the support part.

* * * * *